United States Patent [19]

Blaser

[11] 4,060,059
[45] Nov. 29, 1977

[54] INTERNAL COMBUSTION ENGINE

[75] Inventor: Florencio Blaser, Alexandria, Va.

[73] Assignee: Blaser Engine, Ltd., College Park, Md.

[21] Appl. No.: 801,401

[22] Filed: May 27, 1977

Related U.S. Application Data

[63] Continuation of Ser. No. 422,719, Dec. 7, 1973, which is a continuation of Ser. No. 123,705, March 12, 1971, abandoned.

[51] Int. Cl.² .................. F02B 9/00; F02B 75/10; F02B 33/00; F02F 3/14
[52] U.S. Cl. ................ 123/32 ST; 123/32 E; 123/75 B; 123/119 A; 123/193 P
[58] Field of Search ........... 123/32 E, 32 K, 32 L, 123/32 SP, 32 ST, 75 B, 119 B, 119 D, 124 R, 26

[56] References Cited

U.S. PATENT DOCUMENTS

| 861,711 | 7/1907 | Croft | 123/119 A |
|---|---|---|---|
| 1,165,086 | 12/1915 | Ford | 123/32 E |
| 1,649,700 | 11/1927 | Jobes | 123/32 SJ |
| 2,076,030 | 4/1937 | Kallenberger | 123/32 |
| 2,173,081 | 9/1939 | Barkeij | 123/32 ST |
| 2,185,254 | 1/1940 | Kliesrath | 123/119 A |
| 2,446,280 | 8/1948 | Hancock | 123/143 P |
| 2,758,576 | 8/1956 | Schlamann | 123/32 STR |
| 2,807,250 | 9/1957 | Mallory | 123/75 B |
| 3,092,089 | 6/1963 | Docza | 123/75 B |
| 3,507,261 | 4/1970 | Myers et al. | 123/32 ST |

FOREIGN PATENT DOCUMENTS

| 731,852 | 9/1932 | France | 123/75 CC |
|---|---|---|---|
| 420,113 | 6/1922 | Germany | 123/75 CC |
| 25,960 of | 1907 | United Kingdom | 123/75 CC |
| 333,878 | 8/1930 | United Kingdom | 123/193 P |

Primary Examiner—Ronald H. Lazarus
Assistant Examiner—Panshofam S. Lall
Attorney, Agent, or Firm—Milton M. Field

[57] ABSTRACT

An internal combustion engine with greatly reduced emission of pollutants includes a piston having a piston chamber communicating through orifices with the working chamber of the cylinder and an annular balancing chamber communicating with the working chamber through balancing slots when the piston is between 20° to 30° from its bottom center position. Breathing holes are provided at the opposite end of the balancing chamber. Air from the balancing chamber flows into the working chamber in response to the vacuum therein during the intake stroke, flows from the working chamber into the piston chamber during the compression stroke, and from the piston chamber into the working chamber during the power stroke to stratify the combustion process and inhibit the emission of hydrocarbon and carbon monoxide pollutants. Some exhaust gases are admitted to the balancing chamber during the exhaust stroke to be readmitted to the working chamber during the next intake stroke. Under conditions of higher engine speed or vehicle loading, greater quantities of exhaust gases are recirculated in this manner, thereby inhibiting the emission of nitrogen oxide pollutants.

7 Claims, 11 Drawing Figures

FIG. 1

INVENTOR
FLORENCIO BLASER

BY Shapiro and Shapiro

ATTORNEYS

INVENTOR
FLORENCIO BLASER

BY *Shapiro and Shapiro*

ATTORNEYS

FIG. 4

TOP CENTER
EXHAUST-INTAKE
STROKE

FIG. 5

MID-INTAKE
STROKE

FIG. 6

BOTTOM CENTER
INTAKE-COMPRESSION
STROKE

FIG. 7

MID-COMPRESSION
STROKE

INVENTOR
FLORENCIO BLASER

BY *Shapiro and Shapiro*

ATTORNEYS

FIG. 8 — TOP CENTER COMPRESSION-POWER STROKE

FIG. 9 — MID-POWER STROKE

FIG. 10 — BOTTOM CENTER POWER-EXHAUST STROKE

FIG. 11 — MID-EXHAUST STROKE

INVENTOR
FLORENCIO BLASER
BY Shapiro and Shapiro
ATTORNEYS

INTERNAL COMBUSTION ENGINE

This is a continuation of application Ser. No. 422,719, filed Dec. 7, 1973, which, in turn, is a continuation of application Ser. No. 123,705, now abandoned, filed Mar. 12, 1971.

BACKGROUND OF THE INVENTION

This invention relates to an internal combustion engine and, more particularly, to internal combustion engines with greatly reduced emission of pollutants.

As the emission from the automotive internal combustion engine and their substantial contribution to air pollution have become known, there has been a great deal of interest in the goal of a virtually pollution-free automobile. This has led to the adoption of increasingly more stringent governmental specifications and requirements which have given great impetus to the search for a satisfactory solution. A number of alternative power sources, such as the steam engine and battery power, have been considered, but these alternatives have a great number of practical drawbacks. It has also been proposed that expensive, bulky, and complex exhaust thermal reactors and catalytic converters be added on to existing engines. However, these solutions, which aim at cleaning up the combustion products after they are created, are, at best, no more than stopgap measures. In terms of cost, maintainability, reliability, performance, and economy, these measures would, effectively, move the internal combustion engine back in time to the turn of the century when the automobile was an expensive and complex device suitable for operation only by the rich.

A more promising approach involves an investigation of the combustion process and the activities within the combustion chamber itself and consideration of the causes of the principal pollutants which appear in the engine exhaust and crankcase blowby. Unburned hydrocarbon droplets tend to collect on cylinder walls and due to the relative coolness of the wall are not completely combusted. Likewise, unburned hydrocarbons are forced into the crevice between the cylinder wall and the piston above the first ring and are not completely burned. It has been found that the emission of unburned hydrocarbons is at a maximum for rich mixtures and at lower engine speeds and falls off for lean mixtures and at higher engine speeds. Carbon monoxide is another emission product which results from imcomplete combustion. The production of carbon monoxide is also at a maximum at lower engine speeds and for rich mixtures, falling to a minimum for lean mixtures and at higher speeds. Oxides of nitrogen are formed at the higher engine temperatures which are characteristic of high engine speeds and vehicle loading. As a result, the emission of nitrogen oxides tends to be negligible at lower engine speeds and loading and increases sharply at higher engine speeds and loading.

Before considering prior art proposals for modifying the combustion process to reduce these pollutants, it is well be recognize that any solution, if it is to meet with ready acceptance, should accommodate to certain practice realities. Since the great bulk of the automotive vehicles in use today fall within the category of normal family cars, any solution to the problem should meet the demands of vehicle of this type. The system should be suitable for mass-production and should not add appreciably to the cost of the vehicle. Since family vehicles are frequently maintained by relatively unskilled mechanics, it is essential that the system adopted should be easily maintained at normal maintenance intervals. Moreover, the system should be somewhat fail safe — if the system fails in whole or in part, the engine should not be destroyed as a consequence. Engines presently provided in family cars often last as long as 100,000 miles without the need of major overhaul. Therefore, the components of the system providing a pollution-free engine should have a mean life of at least 100,000 miles. In addition, the system adopted should not significantly affect the operating economy of the family automobile. To summarize, a pollution-free engine must not make the normal family car appreciably more expensive or difficult to maintain or less reliable or economical to operate than present day vehicles of this type.

These criteria must be kept in mind when we examine existing proposals for the modification of the combustion process itself. One prior art approach involves the use of a fuel injection stratified charge engine of the types proposed by Sir Harry Ricardo's group and FM M.A.N. These engines, however, which are, in effect, part otto cycle and part diesel engines, are subject to the drawbacks that they are noisy and expensive. The Texaco Combustion Process as described in *SAE Transactions*, 1961, pp.120–134, is a promising candidate of the stratified charge type. However, the Texaco Combustion Process requires very precise timing and control functions to reach its low emission potential, and the manufacturing cost may be too high for general use.

Another method of modifying the combustion process involves the injection of air into the cylinder during combustion. There have been a number of prior art proposals to this effect including, more recently, the patents of Alfred Candelise, such as U.S. Pat. No. 3,073,289. This patent disclosed experimental verification of the technique demonstrating significant reductions in carbon monoxide and unburned hydrocarbon production However, the prior art of this type, including the patents of Candelise, require the use of a mechanical compressor to provide the pressurized air and, usually, the use of some sort of mechanical timing device to time the introduction of the air to the cylinder. These add-on elements contribute greatly to the cost and complexity of the engine.

While these prior art engines are capable of reducing the emission of unburned hydrocarbons, they do not control the emission of the nitrogen oxides. For this purpose, it has been proposed to recirculate the exhaust gases. It has been found that devices which return up to 15% of the engine exhaust to the intake manifold reduce peak engine temperatures and thus reduce nitrogen oxide emissions. However, this expedient involves the addition of a recirculation pipe and requires the provision of a valve for pressure balancing, thus increasing the complexity and cost of the engine.

SUMMARY OF THE INVENTION

It is accordingly the principal object of the invention to provide an improved internal combustion engine having greatly reduced emission of pollutants. More specifically, it is an object of the invention to provide an internal combustion engine with reduced emission of unburned hydrocarbons, carbon monoxide and nitrogen oxides.

It is another object of the invention to provide an internal combustion engine of this character without significantly increasing the cost of complexity thereof.

To this end, it is a further object of the invention to provide an internal combustion engine with no additional moving parts having greatly reduced emission of unburned hydrocarbons, carbon monoxide and nitrogen oxides. More generally, it is an object of the invention to provide an engine of this character which can be built economically, can be easily maintained, is highly reliable, and which can be operated without adversely effecting operating economy.

An additional object of the invention is the provision of a pollution-free engine which provides pollution-free operations while eliminating such expedients as the exhaust manifold air injection system, differential distributors, and positive crankcase ventilation valves in present usage; and thermal reactors, catalytic reactors, and fuel injection in contemplated usage.

Briefly, the invention involves an approach which uses the conditions that exist or that can be made to exist naturally within an internal combustion engine, such as is used in a normal family car, to encourage the removal of emissions recognized as harmful. The motions of the basic engine components and the over and under pressures which are naturally produced are used to produce two phenomena which are of known value in the reduction of pollutants. First, a varied air-fuel ratio is provided during combustion. The combustion process begins in a relatively rich mixture. As the combustion process continues, air is fed into the working chamber to produce a progressively leaner condition. Ultimately, sufficient air is added to the combustion process to completely burn the hydrocarbons and oxidize the carbon monoxide producing carbon dioxide. The effectiveness of a varying air-fuel ratio during combustion to reduce the emissions of unburned hydrocarbons and carbon monoxide is well documented in, for example, the aforementioned Candelise patents. Second, the means whereby the air is introduced also serves as means to recirculate some of the exhaust gases during high RPM and vehicle loading operation of the engine. This, as has been mentioned hereinabove, it an effective technique for reducing the $NO_x$ emissions. Whereas, as has been demonstrated, the prior art achieved these phenomena by using relatively complex equipment exterior to the basic engine with an attendant increase in complexity and cost, by virtue of the present invention, these phenomena are provided by using the natural behavior of the engine without adding any additional moving parts to the basic engine. Moreover, it should be possible with engines embodying the present invention to eliminate such present day add-on equipment as the PCV valves and exhaust manifold air injection systems.

To these ends, according to the invention, the piston is provided with a vented chamber in the piston crown, and a balancing chamber is provided around the cylinder. The balancing chamber has orifices which communicate with the working chamber of the cylinder when the piston travels between a point near the bottom of the intake stroke and a point shortly following the start of the compression stroke. By virtue of the vacuum condition then existing in the working chamber, air is aspirated from the balancing chamber into the working chamber. The balancing chamber, which is provided with breathing holes communicating with the crankcase, will, in turn, aspirate air from the crankcase. Mixing of the air aspirated into the working chamber with the air-fuel mixture is inhibited by a lack of turbulence and the density of the carbureted fuel-air mixture.

There will then exist a mechanically-induced stratifed charge condition. To attain the creation of this condition, the intake valve is opened later in the cycle than is normal practice in present engines to maintain a relatively high vacuum at the bottom of the cylinder. It is also desirable to adjust the carburetor to produce a richer mixture throughout its operating range than is present practice. As the piston begins to be driven up on its compression stroke, the aspirated air is heated by the piston (from the heat of the previous cycle) and by compression itself as is the fuel-air mixture. The increase in pressure within the working chamber causes the aspirated air to flow through the piston chamber orifices into the piston chamber. The to directed combustion separation between these two gaseous elements is thus maintained by the large difference in temperature and density and the chamber in the piston crown. Close to the top of the compression stoke, the spark occurs, and as the piston crosses top dead center, the bulk of the expansion of the burning fuel-air mixture occurs. Cylinder pressure and temperature will go up sharply, promoting the downward movement of the piston and allowing the expansion of the gases present within the working chamber of the cylinder. This will cause the pressure within the piston chamber be exceed the pressure within the working chamber and aspirated air within the piston chamber will be directly by the piston chammber orifices into the working chamber. The orifices will be designed to promote a relatively high velocity flow to promote turbulence and mixing of the aspirated air with the still burning fuel-air mixture. This will promote the complete combbustion of the hydrocarbons and supply sufficient air to allow the carbon monoxide to oxidize to produce carbon dioxide. It will also serve to maintain generally a higher cylinder temperature and pressure than would normally be present at this time. The result of this more complete combustion is higher thermal efficiency and drastically reduced emissions. The exhaust valve will open before bottom dead center of the power stroke and slightly before the engine is allowed to aspirate air from the balancing chamber thus drastically reducing the cylinder pressure and temperature and starting the movement of the combustion gases into the exhaust manifold. At this time, the balancing orifices or air aspiration passages are allowed to open by virture of the position of the piston. As a function of engine RPM, several things may happen. Under idle and very low engine speed conditions, air will be aspirated to complete the scavenging of the remaining combustion products thus offsetting the poor performance of the normal carburetor in providing the proper fuel-air ratio during these conditions. Under conditions of high engine speed or vehicle loading, some of the exhaust gases will be pulled into the balancing chamber surrounding the cylinder by virtue of the higher pressure existing within the working chamber under these circumstances. These exhaust gases will then be aspirated into the working chamber on the next intake stroke. As the RPM or loading increases, more of the exhaust gases will be recycled in this manner, affecting a significant reduction in nitrous oxide emissions, which, as has been demonstrated above, are particularly troublesome under these conditions. However, with higher RPM operation it is much easier to achieve a fuel-air ratio which will result in complete combustion and, thus, a smaller quantity of oxygen will be needed under these conditions to promote complete combustion of the hydrocarbons and carbon monoxide than will be necessary under the low engine speed conditions. As a result, the greater recirculation of exhaust gases during high RPM operation will not adversely affect the reduction of the emissions of unburned hydrocarbons and carbon monoxide achieved by the aspiration of air rich in oxygen during low engine speed conditions. It is also to be noted that because of the aspiration of air from the crankcase, the pressure within the crankcase is significantly lowered so that engine blowby product are recirculated to the engine rather than being emitted, thus making it possible, in some cases, to omit the PCV valve which is now a requirement of internal combustion engines.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment.

DETAILED DESCRIPTION OF THE PREFERRED EMBODIMENTS

Figure 1:
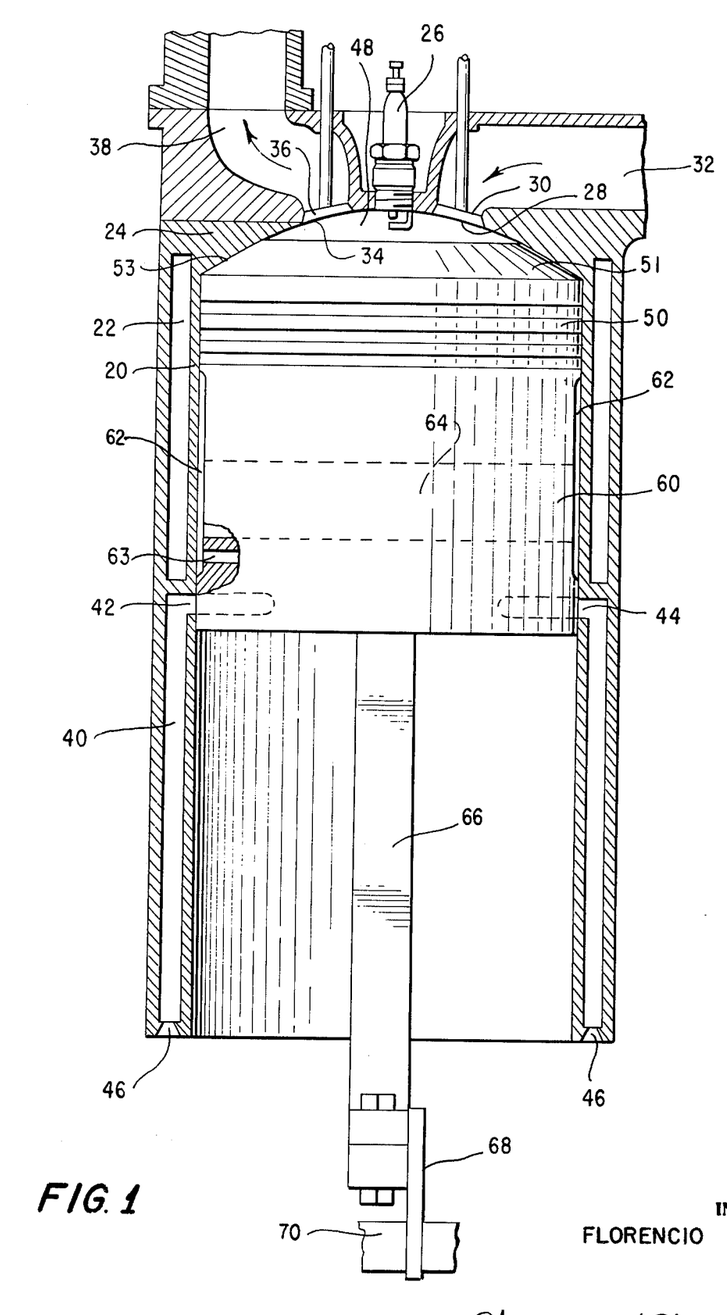
FIG. 1 is a vertical section view of one cylinder of an internal combustion engine of the invention.
Figure 2:
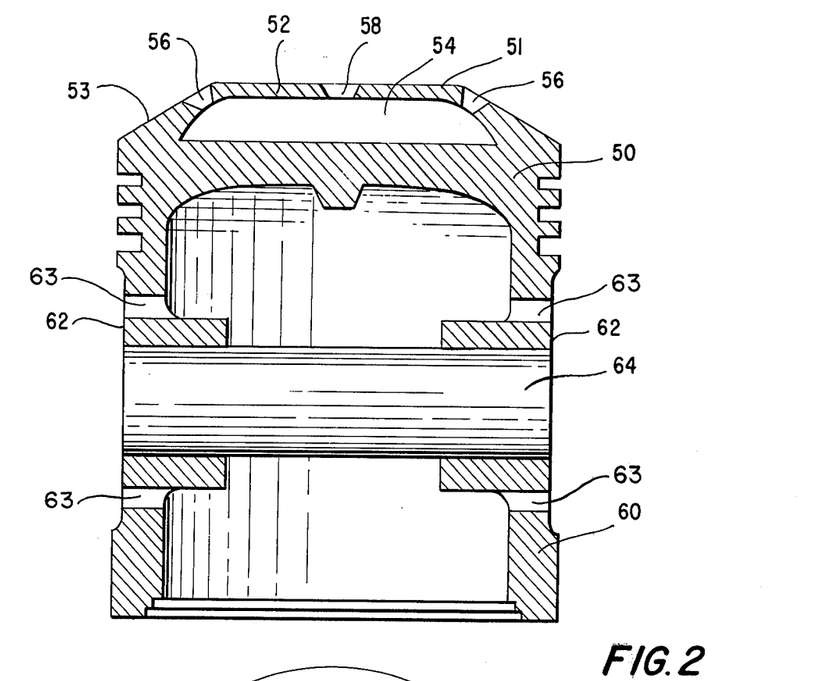
FIG. 2 is a vertical section view of a piston of the invention.
Figure 3:
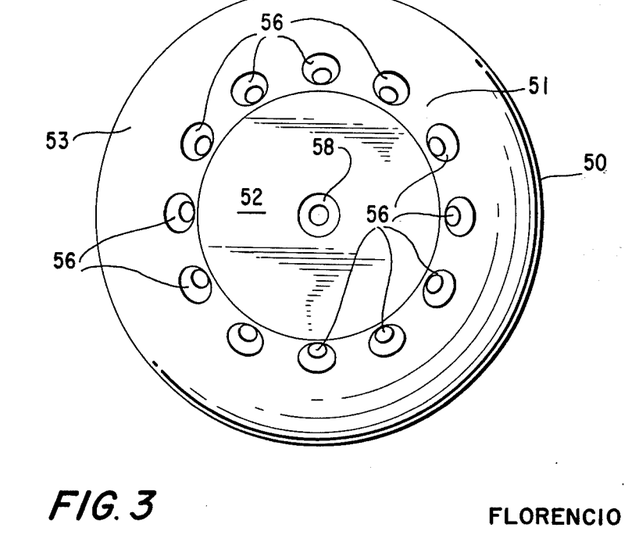
FIG. 3 is a plan view of the piston of FIG. 2.

It is to be understood that the principles of the invention are applied to each of the cylinders of a multi-cylinder internal combustion engine which, may, for example, be a four, six, or eight cylinder engine. However, in the present specification and drawings only one of the cylinders will be shown, it being understood that each of the remaining cylinders of the engine will be essentially the same and operate in the same manner. Turning, then, to FIG. 1, it will be seen that the engine comprises a cylinder 20 having a typical cooling chamber 22 and closed at one end by a cylinder head 24. Although the cylinder head is illustrated as of hemispherical configuration, it is to be understood that any cylinder head configuration common in the art may be employed. A spark plug 26 extends through cylinder head 24 and is, as is common in the art, positioned between intake and exhaust openings. An intake valve opening 28 may be closed by an intake valve member 30 by mechanisms well known in the art and leads to an intake duct 32 through which the air-fuel mixture from the carburetor will be provided. An exhaust valve opening 34 cooperates with an exhaust valve member 36 which is also operated in a manner well known in the art. An exhaust valve duct 38 receives exhaust gases from exhaust valve opening 34 and is connected to an exhaust manifold in a manner well known in the art.

At a point below cooling chamber 22, cylinder 20 is surrounded by an annular balancing chamber 40 which communicates with the interior of the cylinder through a pair of balancing slots 42 and 44 at diametrically opposed sides of the cylinder. Slots 42 and 44, which serve as balancing or air aspirating orifices, may, for example, be 0.25 inch high and should be of sufficient width to provide a cross-sectional area equal to the effective area of the intake valve opening 28 with the valve open. The slots are located at a position which is less than about 20° to 30° from the bottom center position of the piston to be presently described. As will be noted from FIG. 1, slots 42 and 44 are located at the upper end of balancing chamber 40, the opposite end of which is provided with a plurality of breathing holes 46 which will aspirate air into breathing chamber 40 from the crankcase as will be presently described. Breathing holes 46 are provided in a circular array, and the total area of the openings should equal 1/10 the total area of slots 42 and 44. It will be noted that breathing holes 46 are tapered inwardly with the smaller end adjacent the inside of balancing chamber 40. This will permit easy flow into balancing chamber 40 and inhibit flow out of chamber 40 into the crankcase.

Figure 4:
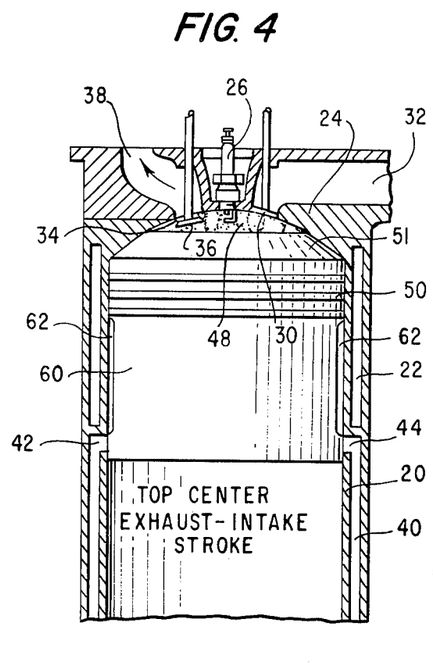
FIGS. 4 through 11, inclusive, are schematic diagrams of a cylinder of an internal combustion of the invention at various points in the operation thereof.
Figure 6:
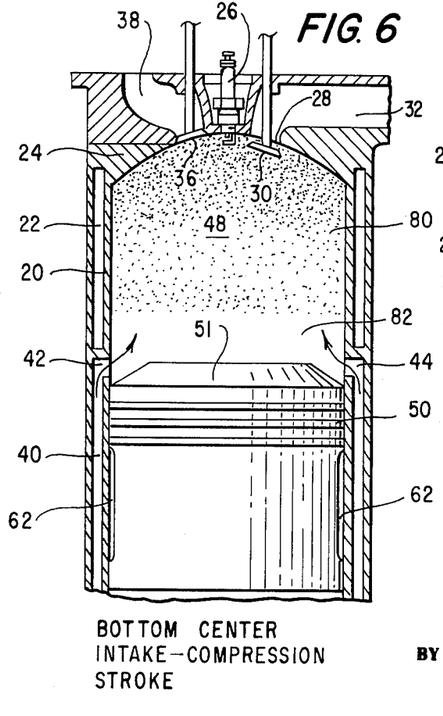
Figure 8:
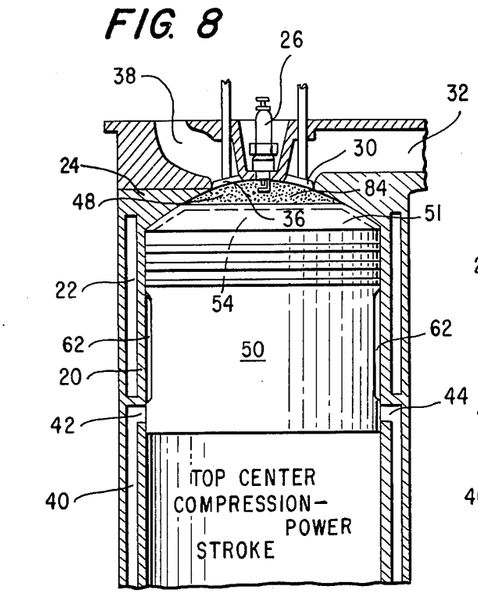
Figure 10:
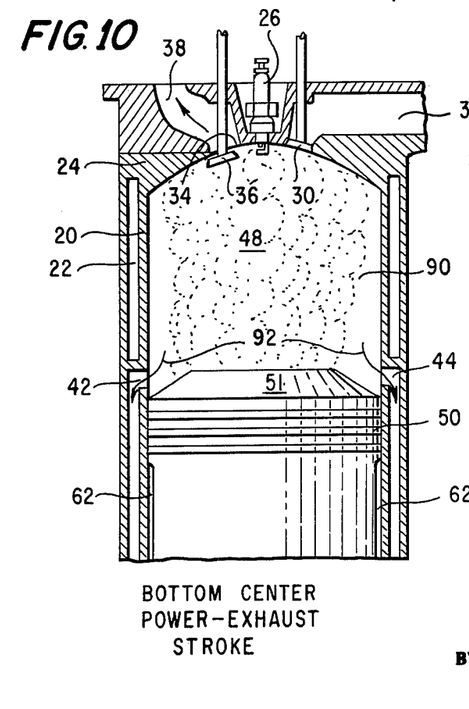

It will be observed that a working chamber 48 is provided within cylinder 20 by a piston 50 which reciprocates between a first, top center position as illustrated in FIGS. 1, 4 and 8 and a second, bottom center position as shown in FIGS. 6 and 10. Thus, working chamber 48 is a chamber varying in volume, having a minimum volume when it serves as a combustion chamber with the piston in its first or top center position and having its maximum volume when the piston is in its second or bottom center position.

Piston 50 is provided with a piston crown 51 having a generally flat center portion 52 surrounded by an angled annular outer portion 53 which is adapted to seat against the hemispherical surface of cylinder head 24 when the piston is in its first, top center position as shown in FIGS. 1, 4 and 8. A piston chamber 54 is provided below piston crown 51 and communicates with the working chamber 48 through a plurality of piston chamber orifices 56 extending in a circular array through annular piston crown portion 53 and, if desired, a single axially located orifice 58 centrally of center portion 52 of the piston crown. For reasons which will be more readily apparent hereinafter, orifices 56 and 58 are tapered having their smaller end at the inside of piston chamber 54. Typically, twelve of the orifices 56 will be provided and each of these orifices will have a maximum diameter of ⅛ inch with the angle of convergence of the tapered wall thereof being between 30° and 45°. Central orifice 58 will typically be provided with a maximum diameter of ¼ inch and will also have an angle of convergence within the range 30° to 45°. It is to understood, however, that the number and size of orifices 56 and 58 must be selected to permit the pressure in piston chamber 54 to follow the pressure within working chamber 48 and will thus vary depending upon the size and the other operating parameters of a given engine. For reasons which will be made clear hereinafter, the taper of orifices 56 and 58 is provided to promote a smooth unturbulent flow of air into piston chamber 54 and from working chamber 48 and a jet-like flow of air out of chamber 54 as pressure conditions dictate. Orifices 56 are drilled typically at an angle of 35 to 40° degrees from the direction of piston travel and are pointed out toward the cylinder wall.

Since it is desirable to maintain modern relatively high compression ratios, the volume $V_{pc}$ of the piston chamber plus the remaining combustion chamber volume $V_{cc}$ of working chamber 48 with the piston in its top center position will be equal to the combustion chamber volume employed in a conventional prior art engine of equivalent size. The volume of the piston chamber may be related to the volume of the combustion chamber in accordance with the following equation:

$V_{pc} \cong \frac{1}{3} (V_{cc} + V_{pc})$.

However, the volume of piston chamber 54 could be as low as 25% of the volume of a conventional combustion chamber.

Piston 50 is, as is conventional in the art, provided with a piston reciprocates 60 having recesses 62 on opposite sides from which wrist pin relief orifices 63 communicate with the bottom side of piston 50. It is to be understood that this space communicates with the crankcase through a suitable orifice (not shown). Piston 50 is provided with a wrist pin 64 by means of which it is connected to a connecting rod 66 which, as shown in FIG. 1, is in conventional fashion connected to a crank arm 68 and by the crank arm 68 to a drive shaft 70. Thus, as is well known in the art, as piston 50 reciprocate within cylinder 20, it will cause drive shaft 70 to rotate.

For reasons which will be presently apparent, the timing of intake and exhaust valve members 30 and 36 and the design of intake valve opening 28 will differ from conventional practice. It is preferable that the air-fuel mixture be introduced into the working chamber with a minimum of turbulence. This may be accomplished by employing an intake passageway which is larger than is conventional to reduce gas velocity. The valve could be slightly shrouded and be provided with as smooth as possible an intake passage so that the air-fuel intake charge will be evenly and smoothly distributed about the top of the cylinder. The intake valve should open between 10° to 20° after the piston passes its top center position on the intake stroke and close between 10° and 20° after the piston passes its bottom center position on the compression stroke. The exhaust valve should open at about 45° before the bottom center position of the piston on the power stroke and close before the intake valve opens. Although it is normal practice to maintain some overlap between the opening of the exhaust and intake valves to ensure complete filling of the cylinder, in the engine of the present invention the working chamber is filled from annular chamber 40, making it possible to avoid overlap of the exhaust and intake valves and thus promote a higher vacuum within the working chamber at the time it is desired to aspirate air into the working chamber from annular chamber 40.

The operation of the engine of this invention will be best understood from a consideration of the diagrams of FIGS. 4 through 11, inclusive. Turning first to FIG. 4, piston 50 is shown in its first, top center position at a time in the cycle corresponding to the end of the exhaust stroke and the beginning of the intake stroke. Exhaust valve member 36 is in its open position, as is customary in conventional engines, to allow some measure of scavenging of the combusted materials. However, intake valve member 30 is in its closed position.

Figure 5:
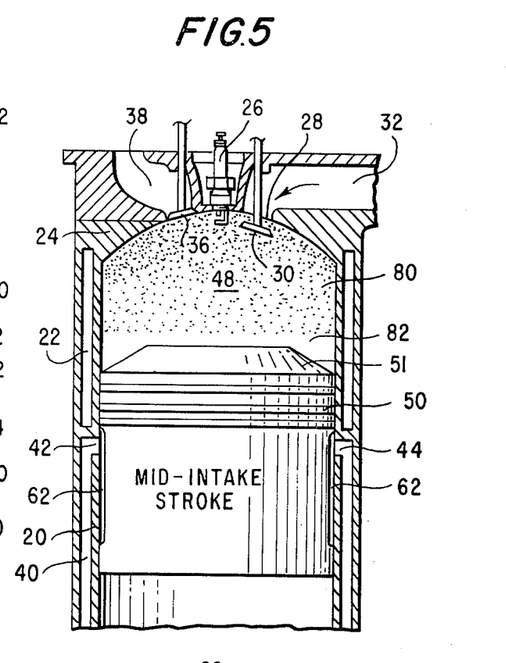

As shown in FIG. 5, piston 50 has moved down in cylinder 20 on the intake stroke. It is to be noted that the opening of intake valve member 30 was delayed until piston 50 has started its downward travel to allow piston 50 some physical displacement from the now incoming air-fuel mixture. It is to be noted from FIG. 5 that the air-fuel mixture 80 is more dense in the vicinity of cylinder head 24 than in the vicinity of piston crown 51 and that, indeed, a small zone 82 of air is adjacent piston crown 51. This condition is encouraged by the elimination of turbulence as much as possible in the inflow of the air-fuel mixture from intake valve opening 28.

FIG. 6 shows piston 50 in its bottom center position between the intake and compression strokes. Due to the expansion of working chamber 48, the pressure therewithin has become greatly diminished providing a high vacuum which causes aspiration of air from balancing chamber 40 through balancing slots 42 and 44. The design of balancing slots 42 and 44 is such that this inflow of aspirated air is with minimized turbulence so as to maintain the rich mixture 80 at the upper end of the working chamber 48 and the zone 82 of air and residual exhaust gases in the vicinity of piston chamber 34. It will be noted that this zone is now enlarged as compared to the situation which applied in FIG. 5. When air aspirates from balancing chamber 40 into working chamber 48, there will also be a flow of air from the crankcase through breathing holes 46 at the lower end of balancing chamber 40. It is to be noted in this regard that the tapered configuration of holes 46 is designed to promote flow in this direction.

Figure 7:
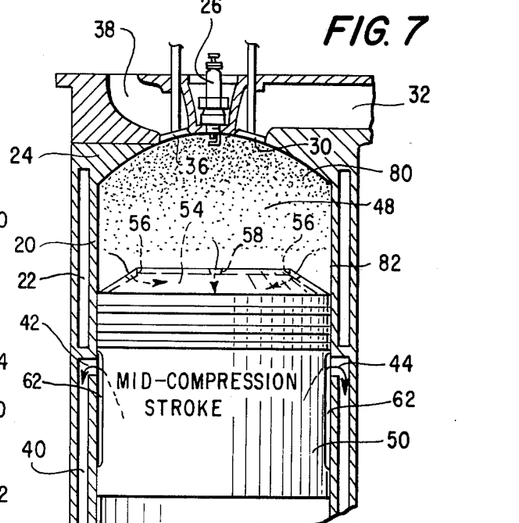

Turning to FIG. 7, piston 50 is shown at an intermediate point of the compression stroke moving upwardly toward the cylinder head. The rich mixture 80 near the top of the cylinder is maintained in a separate zone from the zone of air 82 throughout the compression stroke. As the gases are compressed, however, the air in zone 82 will be forced to flow through piston chamber orifices 56 and 58 into piston chamber 54. This flow is facilitated with minimum turbulence due to the tapered shape of these orifices which permit the pressure within piston chamber 54 to closely follow the pressure in chanber 48 at this part of the cycle. There will, at this time, be a flow of gases from the crankcase to balancing chamber 40 through wrist pin relief orifices 63 and recess 62, which will be aligned with slots 42 and 44, because the pressure in annular chamber 40 will be lower than the crankcase pressure.

As the piston reaches its top center as shown in FIG. 8, the gases within working chamber 48 will be at full compression. The air-fuel mixture will now be a compressed mixture 84 separated from a body of compressed air within piston chamber 54.

Figure 9:
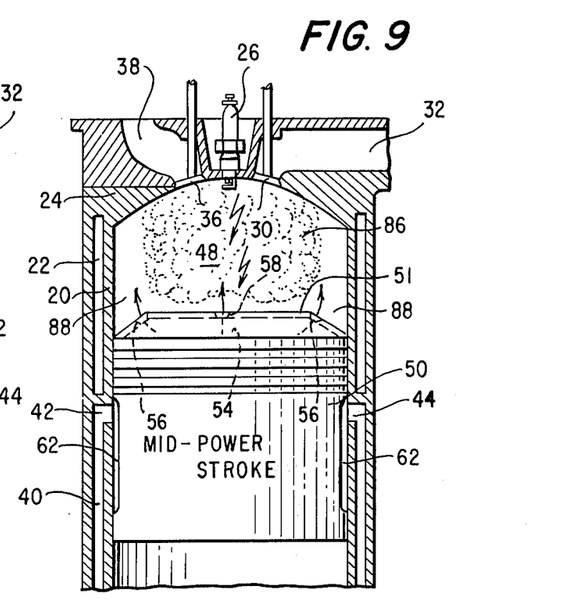

At this time, ignition occurs and a spark is provided by spark plug 26 igniting the air-fuel mixture 84. As the piston crosses its top dead center position, the bulk of the expansion of the burning fuel-air mixture occurs. Cylinder pressure and temperature go up sharply, promoting the downward movement of piston 50 and allowing the expansion of the gases present within working chamber 48. As shown in FIG. 9, when piston 50 reaches an intermediate position of the power stroke, a pressure differential will be established between the air within piston chamber 54 and the gases within working chamber 48. This differential pressure is promoted by the shape of orifices 56 and 58 which tend to impede a tendency of the pressure in piston chamber 54 from following the pressure within combustion chamber 48. When, however, the pressure within piston chamber 54 becomes much greater than the pressure within working chamber 48, the pressure differential becomes large enough to promote a jet flow from balancing chamber 54 through orifices 56 and 58 into combustion chamber 48. This is illustrated in FIG. 9 where the exploding mixture 86 is shown as occupying the greater part of the combustion chamber 48 but with air flow 88 from piston chamber 54 beginning to lean out the burning mixture. This injection of air into the still-burning fuel-air mixture promotes the combustion of the hydrocarbons of the fuel-air mixture and supplies sufficient air to allow the carbon monoxide to oxidize to carbon dioxide, generally maintaining higher cylinder temperature and pressure than would normally be present at this point in the cycle. The result of this more complete combustion is a higher thermal efficiency and drastically reduced emission of unburned hydrocarbons and carbon monoxide. It is to be noted that the jets of air through orifices 56 are directed at an angle toward the cylinder walls to remove the hydrocarbons which normally accumulate there. It is also to be noted that at this point in the cycle the recesses 62 are aligned with balancing slots 42 and 44 permitting communication between annular chamber 40 and the near atmospheric pressure within the crankcase. Thus, the pressure within annular chamber 40 will now approach the atmospheric pressure found within the crankcase.

FIG. 10 illustrates the situation when the piston has reached its bottom center position at the end of the power stroke and at the beginning of the exhaust stroke. Exhaust valve member 36 has now opened, and the combusted mixture 90 within working chamber 48 begins to leave the cylinder through exhaust passage 38. At low engine speeds the pressure within annular chamber 40 will be similar to the pressure within combustion chamber 48, and little of the exhaust gases will flow into annular chamber 40 from working chamber 48. However, as the speed of the engine increases, the residual pressure within working chamber 48 will become greater. This may be explained as caused by the fact that the exhaust gases will not have as much time to leave the working chamber 48 through the exhaust valve opening 34. Thus, exhaust gases will now flow at a greater rate into the annular balancing chamber 40 as shown by arrows 92, because the pressure within the cylinder will now become greater than the pressure within the annular chamber. As the engine speed is raised, a greater proportion of exhaust gases will be introduced into annular chamber 40. These gases will now be stored within annular chamber 40 until the next intake cycle at which time they will be recycled into the working chamber 48. This will effect a significant reduction in nitrous oxide emissions which, as explained heretofore, are particularly troublesome under high engine speed conditions. However, at the higher engine speeds, the unburned hydrocarbons tend to achieve combustion with a smaller intake of additional air and a smaller quantity of oxygen in the air will be needed under these conditions to promote complete combustion of hydrocarbons and carbon monoxide. Typically, up to 30% of the gases stored in annular chamber 40 will be exhaust gases at low engine speeds, and the proportion of exhaust gases in the chamber may reach about 70% for higher engine speeds. Similarly, under high vehicle loading conditions there will be a tendency for the pressure within working chamber 48 to be higher than normal at this point in the cycle, thus prompting greater flow of exhaust gases into balancing chamber 48 from which they will be recycled on the next intake stroke. This will sharply reduce the formation of nitrous oxides.

Figure 11:
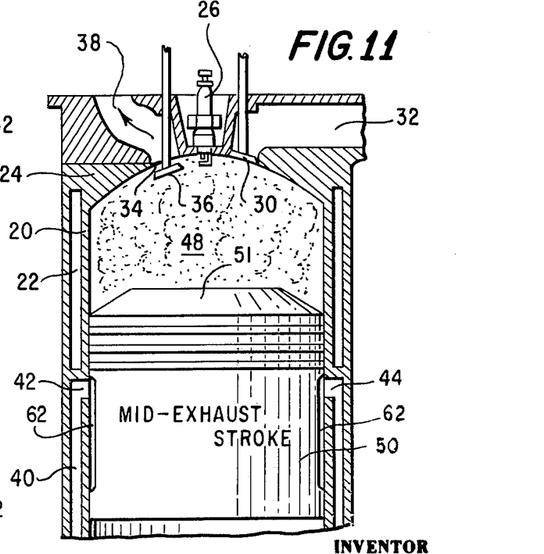

FIG. 11 illustrates an intermediate position of the exhaust stroke with piston 50 returning toward cylinder head 24. The recesses 62 are again aligned with balancing slots 42 and 44 again permitting equalization of the pressure within annular chamber 40 with the pressure within the crankcase. This will help prevent the loss of exhaust gases from annular chamber 40 through breathing holes 46, because the pressure within annular chamber 40 will be approximately the same as the pressure within the crankcase on the other side of the breathing holes. Also, the shape of the breathing holes is designed to inhibit flow out of annular chamber 40 to the crankcase. It is to be noted that a peak RPM operation, the amount of exhaust gases will fill annular chamber 40 to a maximum extent but should not fill the chamber beyond its capacity so as to avoid the introduction of exhaust gases into the crankcase.

While the primary function of the additional air introduced through balancing slots 42 and 44 is the establishment of a stratified combustion condition within working chamber 46, the flow of air (and some exhaust gases) from balancing chamber 40 into working chamber 48 will also tend to improve engine performance at idle by increasing the real compression ratio with increased temperature, improved flame propagation, more stable combustion, and higher pressure operation.

If there is any tendency of the engine to operate with blow-by of exhaust gases past piston 50 during the power stroke, these, as is known in the art, will be introduced into the crankcase. In prior art engines it has been necessary to provide a PCV valve to inhibit such blow-by pollution. However, by virtue of the operation illustrated in FIG. 6, in the engine of the present invention the blow-by products will be reintroduced into the working chamber through breathing holes 46, annular chamber 40, and balancing slots 42 and 44. This may make it possible, in some cases, to eliminate the necessity for expedients such as the PCV valve.

The internal combustion engine of the present invention thus provides several advantages of more complex prior art engines. It achieves reduction of unburned hydrocarbons and carbon monoxide emissions by providing injected air to promote a stratified combustion process, but without the complexity of the Candelise and Texaco Combustion Process systems. Exhaust gases are recycled at high RPM and vehicle loading operation of the engine to inhibit the production of nitrogen oxides which, in the prior art, have required a recyclying of exhaust gases into the intake manifold. The aspiration of gases from the crankcase reduces the pressure therein to an extent making it possible to avoid the need for a PCV valve. All of this is accomplished without the introduction of any new moving parts, thus providing an engine which is economical, easy to maintain, and reliable.

While a preferred embodiment of the invention has been shown and described, it will be apparent to those skilled in the art that changes can be made without departing from the principles and spirit of the invention, the scope of which is defined in the appended claims.

The invention claimed is:

1. A method of operating an internal combustion engine having a cylinder closed at one end, a piston movable within said cylinder between a first position proximate to said one end and a second position remote from said one end to form a working chamber, said piston having a piston chamber, comprising the steps of:

introducing a rich air-fuel mixture into said working chamber from said one end during an intake stroke of said piston;

adding additional air to said working chamber during said intake stroke adjacent said piston as said piston approaches said second position;

transferring said additional air from said working chamber to said piston chamber during a compression stroke of said piston;

igniting said rich air-fuel mixture to produce a quasi-instantaneous first phase of combustion; and transferring said additional air from said piston chamber to said working chamber at an intermediate point of a power stroke of said piston in response to decreasing pressure within said working chamber as said working chamber expands following said first phase of combustion to participate in a second phase of combustion over a period of time of the unburned fuel remaining after said first phase of combustion.

2. A method of operating an internal combustion engine having an engine chamber, a piston movable within said engine chamber to form a working chamber therewith, said engine having a power cycle with an intake event, a compression event, a power event, and an exhaust event, balancing means to admit additional air to said working chamber during said intake event, and storage means for storing said admitted air during said compression event, comprising the steps of:

feeding a rich fuel-air mixture into said working chamber during said intake event;

admitting additional air from said balancing means to said working chamber adjacent said storage means near the end of said intake event to form a zone in said working chamber separate from a zone containing said air-fuel mixture in response to a high vacuum condition present in said working chamber near the end of said intake event;

transferring said additional air from said working chamber to said storage means during said compression event in response to a high pressure condition present in said working chamber during said compression event;

igniting said rich air-fuel mixture near the beginning of said power event to form a quasi-instantaneous first combustion phase; and transferring said additional air from said storage means to said working chamber during said power event in response to a lowered pressure condition in said working chamber as said working chamber expands during said power event to form a second combustion phase over a period of time to burn the remaining fuel present in said working chamber.

3. A method as recited in claim 2, further comprising the step of transferring a portion of the exhaust gases in said working chamber to said balancing means during said exhaust even in response to a pressure differential between said working chamber and said balancing means to provide a mixture of said exhaust gases and additional air in said balancing means for admission to said working chamber during the next intake event.

4. A method as recited in claim 2, wherein said engine chamber is a cylinder and said intake, compression, power and exhaust events are intake, compression, power and exhaust strokes, respectively.

5. A method of operating an internal combustion engine having a cylinder closed at one end, a piston movable within said cylinder between a first position proximate to said one end and a second position remote from said one end to form a working chamber, said piston having a piston chamber, comprising the steps of:

introducing fuel and air into said working chamber during an intake stroke of said piston and providing a relatively rich air fuel mixture adjacent said one end and an excess of air adjacent said piston as said piston approaches said second position;

transferring said excess of air from said working chamber to said piston chamber during a compression stroke of said piston;

igniting said relatively rich air-fuel mixture to produce a quasi-instantaneous first phase of combustion; and transferring said excess of air from said piston chamber to said working chamber at an intermediate point of a power stroke of said piston in response to decreasing pressure within said working chamber as said working chamber expands following said first phase of combustion to participate in a second phase of combustion over a period of time of the unburned fuel remaining after said first phase of combustion.

6. A method of operating an internal combustion engine having an engine chamber, a piston movable within said engine chamber to form a working chamber therewith, said engine having a power cycle with an intake event, a compression event, a power event, and an exhaust event, means to admit fuel and air into said working chamber during said intake event, and storage means for storing an excess of air during said compression event, comprising the steps of:

introducing fuel and air into said working chamber during said intake event and providing a relatively rich air-fuel mixture at an end of said working chamber remote from said storage means and an excess of air adjacent said storage means near the end of said intake event;

transferring said excess of air from said working chamber to said storage means during said compression event in response to a high pressure condition present in said working chamber during said compression event;

igniting said relatively rich air-fuel mixture near the beginning of said power event to form a quasi-instantaneous first combustion phase, and transferring said excess of air from said storage means to said working chamber during said power event in response to a lowered pressure condition in said working chamber as said working chamber expands during said power event to form a second combustion phase over a period of time to burn the remaining fuel present in said working chamber.

7. A method as recited in claim 6, wherein said engine chamber is a cylinder and said intake, compression, power and exhaust events are intake,, compression, power and exhaust strokes, respectively.

* * * * *

UNITED STATES PATENT OFFICE
CERTIFICATE OF CORRECTION

Patent No. 4,060,059   Dated November 29, 1977

Inventor(s) Florencio Blaser

It is certified that error appears in the above-identified patent and that said Letters Patent are hereby corrected as shown below:

Column 1, line 61, "be" is changed to --to-- .

Column 2, line 39, a period is inserted after "production" .

Column 4, lines 14 and 15, "to directed combustion" is deleted.

Column 4, line 32, "combbustion" is changed to --combustion-- .

Column 7, line 8, "reciprocates" is changed to --skirt-- .

Column 11, Claim 3, fourth line, "even" is changed to --event-- .

Signed and Sealed this

Twenty-first Day of March 1978

[SEAL]

Attest:

RUTH C. MASON
Attesting Officer

LUTRELLE F. PARKER
Acting Commissioner of Patents and Trademarks